A. LEBUS.
Car-Movers.
No. 195,936. Patented Oct. 9, 1877.
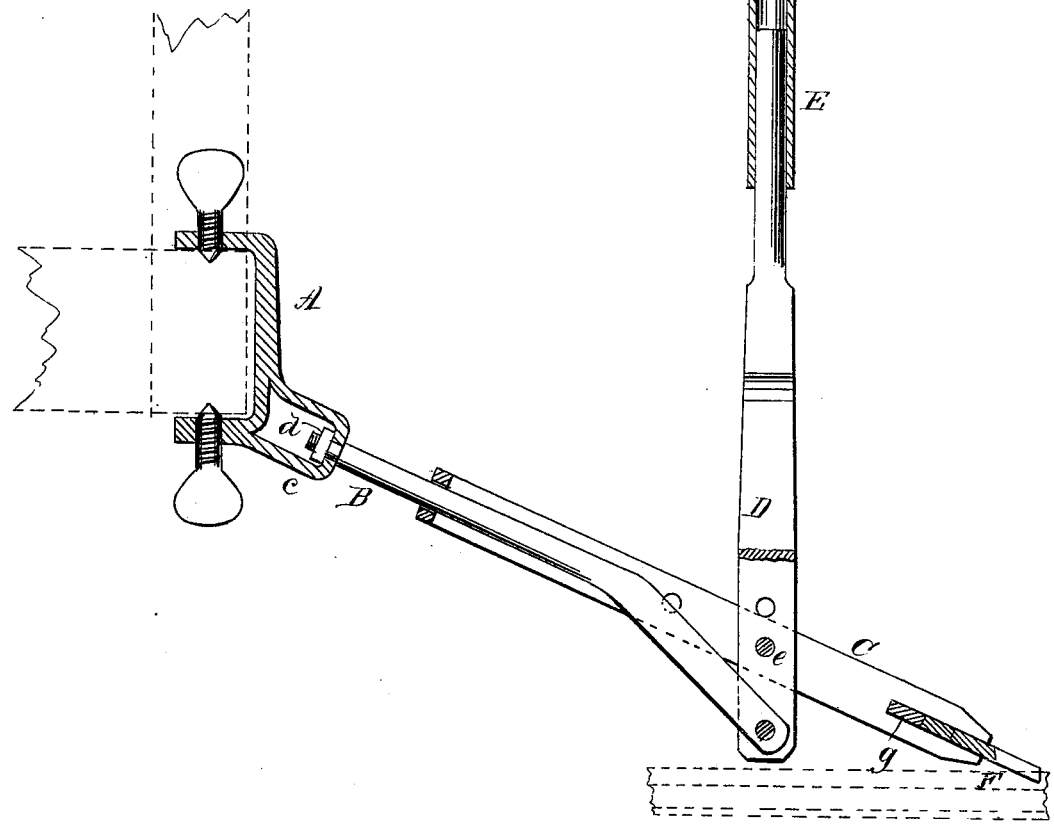
WITNESSES:
E. Wolff
J. H. Scarborough
INVENTOR:
A. Lebus
BY Munn &Co.
ATTORNEYS.

UNITED STATES PATENT OFFICE.

ANDREW LEBUS, OF FLORA, ILLINOIS.

IMPROVEMENT IN CAR-MOVERS.

Specification forming part of Letters Patent No. 195,936, dated October 9, 1877; application filed August 24, 1877.

*To all whom it may concern:*

Be it known that I, ANDREW LEBUS, of Flora, in the county of Clay and State of Illinois, have invented a new and Improved Car-Mover, of which the following is a specification:

Figure 1 is a side elevation, partly in section, of my improved car-mover. Fig. 2 is a front view.

Similar letters of reference indicate corresponding parts.

The invention consists in certain improvements in jacks for moving railway-cars, which will be hereinafter more fully described, and then pointed out in the claim.

In the drawing, A is a clamp, of sufficient width to receive the sill of the car, and $b$ are screws passing through the jaws of the said clamp for securing it to the sill. A loop, $c$, is formed on the clamp A for receiving the end of the rod B, which is secured therein by a nut, $d$.

The rod B passes through the end of a fork, C, and is bent to admit of pivoting it to the lever D, which is fulcrumed on a bolt, $e$, that passes through the fork C. The outer end of the lever D is round, and to it a sliding tubular handle, E, is fitted.

A steel plate, F, having formed in it a V-shaped notch, is provided with projections $f$, that are received by apertures in the branches of the fork C, and are secured therein by the key $g$.

When it is desired to move a car, the clamp A is secured to its sill, and the V-shaped notch in the plate F is placed on the track-rail, the lever D is moved, throwing the rod B forward through the end of the fork C, and propelling the car forward. The lever is then moved backward, causing the plate F to take a new bite, and the forward movement of the lever is repeated.

Whenever the leverage is found insufficient for the work the tubular handle E is drawn out, thereby increasing the length of the lever D.

This device is designed for moving cars about in car shops and yards, and around freight-depots, where it is frequently required to move a car a short distance.

I am aware of the existence of a car-moving jack consisting of two bars sliding one upon the other, and operated by means of a lever and connecting-link. By this construction, however, the friction on the sides of the sliding bars will decrease the force, and the jack is not so simple and effective as mine.

Having thus described my invention, I claim as new and desire to secure by Letters Patent—

The car-moving jack herein described, consisting of the forked frame or bar C, sliding rod B, having a downwardly-bent rear arm, clamp, and supporting-piece A provided with set-screws, lever D, detachable handle E fulcrumed in the bar C, and notched rail-plate F, all constructed and relatively arranged as herein set forth, for the purpose specified.

ANDREW LEBUS.

Witnesses:
   T. F. VANDAVEER,
   M. O. WITHERSPOON.